United States Patent
An (10) Patent No.: US 9,137,197 B2
(45) Date of Patent: Sep. 15, 2015

(54) IP ROUTER AND METHOD OF ALLOCATING IP ADDRESS

(71) Applicant: SAMSUNG ELECTRONICS CO., LTD., Suwon-si (KR)

(72) Inventor: Kwang-hwan An, Suwon-si (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 13/710,849

(22) Filed: Dec. 11, 2012

(65) Prior Publication Data

US 2013/0163473 A1 Jun. 27, 2013

(30) Foreign Application Priority Data

Dec. 22, 2011 (KR) .................. 10-2011-0140605

(51) Int. Cl.
*H04L 12/28* (2006.01)
*H04L 12/56* (2006.01)
*H04L 29/12* (2006.01)
*H04L 12/24* (2006.01)

(52) U.S. Cl.
CPC ........ *H04L 61/2015* (2013.01); *H04L 41/0806* (2013.01); *H04L 61/2061* (2013.01); *H04L 61/6068* (2013.01)

(58) Field of Classification Search
CPC ............ H04L 41/0806; H04L 61/6068; H04L 61/2015; H04L 61/2061
USPC ........................... 370/254–256, 401, 352, 353
See application file for complete search history.

(56) References Cited

U.S. PATENT DOCUMENTS

| 7,006,472 | B1 * | 2/2006 | Immonen et al. ............. 370/332 |
| 7,159,016 | B2 * | 1/2007 | Baker ........................... 709/220 |
| 7,633,948 | B2 * | 12/2009 | Yokomitsu et al. ...... 370/395.54 |
| 7,711,801 | B2 * | 5/2010 | Lai ................................ 709/220 |
| 7,929,452 | B2 * | 4/2011 | Diamant et al. ............. 370/252 |
| 8,477,649 | B2 * | 7/2013 | Diamant et al. ............. 370/252 |
| 2003/0115298 | A1 * | 6/2003 | Baker ........................... 709/220 |
| 2005/0041596 | A1 * | 2/2005 | Yokomitsu et al. ........... 370/252 |
| 2005/0080891 | A1 * | 4/2005 | Cauthron ...................... 709/223 |
| 2005/0097223 | A1 | 5/2005 | Shen et al. |
| 2005/0138346 | A1 * | 6/2005 | Cauthron ......................... 713/2 |

(Continued)

FOREIGN PATENT DOCUMENTS

EP 2369815 A1 9/2011

OTHER PUBLICATIONS

Communication, dated Apr. 16, 2013, issued by the European Patent Office in counterpart European Application No. 12180481.9.

(Continued)

*Primary Examiner* — Chuong T Ho
(74) *Attorney, Agent, or Firm* — Sughrue Mion, PLLC (57) ABSTRACT

An Internet Protocol (IP) router and a method of allocating an IP address are provided. The IP router includes: an IP management unit which, if the IP router is connected to a second router connected to a second WAN, is allocated a preset number of IP addresses from the second router; and a Dynamic Host Configuration Protocol (DHCP) server unit which allocates the allocated IP addresses to at least one communication device connected to the IP router to form a sub network between the at least one communication device connected to the IP router and a communication device connected to the second router.

14 Claims, 5 Drawing Sheets

(56) References Cited

U.S. PATENT DOCUMENTS

2008/0120365 A1* 5/2008 Lai .............................. 709/203
2008/0294755 A1* 11/2008 Melsen et al. ............... 709/220
2010/0121946 A1* 5/2010 Claes et al. .................. 709/223
2012/0011274 A1* 1/2012 Moreman ..................... 709/238
2012/0054293 A1* 3/2012 Diamant et al. ............. 709/212

OTHER PUBLICATIONS

Shen, Naiming et al. "DHCP Proxy Server Mirco-block Allocation Scheme for IP Address Pool Management" Jan. 2007, pp. 1-10; XP015048521; ISSN 0000-0004.

* cited by examiner

IP ROUTER AND METHOD OF ALLOCATING IP ADDRESS

CROSS-REFERENCE TO RELATED APPLICATION

This application claims priority under 35 U.S.C. §119 from Korean Patent Application No. 10-2011-0140605, filed on Dec. 22, 2012 in the Korean Intellectual Property Office, the disclosure of which is incorporated herein by reference in its entirety.

BACKGROUND

1. Field

The present general inventive concept generally relates to an Internet Protocol (IP) router and a method of allocating an IP address, and more particularly, to an IP router which can form a communication device directly connected thereto and a communication device connected to another router into one sub network, and a method of allocating an IP address.

2. Description of the Related Art

A router is a device which relays different networks and sets a route to transmit information in communication networks which operate with different protocols.

With the recent increase in apparatuses supporting networks, Internet Protocol (IP) routers are generally used in homes in order to connect a plurality of communication devices to an Internet network.

However, a related art IP router forms only communication devices that are directly connected thereto into a sub network. Accordingly, if a plurality of IP routers are used in one home, communication devices connected to different routers belong to different sub networks. Therefore, free communications are difficult among the communication devices connected to the different routers.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide an Internet Protocol (IP) router which can form a communication device directly connected thereto and a communication device connected to another router into one sub network, and a method of allocating an IP address.

According to an aspect of an exemplary embodiment, there is provided an IP router which is connectable to a first wide area network (WAN). The IP router may include: an IP management unit which, if the IP router is connected to a second router connected to a second WAN, is allocated a preset number of IP addresses from the second router; and a Dynamic Host Configuration Protocol (DHCP) server which allocates the allocated IP addresses to at least one communication device connected to the IP router to form a sub network between the at least one communication device connected to the IP router and a communication device connected to the second router.

The IP router may further include: a first communication interface unit which performs a communication connection to the first WAN; a second communication interface unit which performs a communication connection to the second router; and a third communication interface unit which performs a communication connection to the at least one communication device connected to the IP router.

The DHCP server unit may control the at least one communication device connected to the IP router to communicate with the first WAN through the first communication interface unit.

The DHCP server unit may control the at least one communication device connected to the IP router to communicate with the second WAN through the second communication interface unit.

The DHCP server unit may control the at least one communication device connected to the IP router to communicate with the communication device connected to the second router through the second communication interface unit.

The DHCP server unit may control the at least one communication device connected to the IP router to communicate with the first or second WAN according to a pre-set setting.

The IP router may further include a sensing unit which, if the IP router is booted up, blocks an operation of the third communication interface unit and senses whether the second router has been connected to the second communication interface unit.

The IP management unit may be allocated the number of IP addresses, which is greater than or equal to the number of communication devices connected to the IP router, from the second router.

According to an aspect of another exemplary embodiment, there is provided a method of allocating an IP address of an IP router which is connectable to a first WAN. The method may include: if the IP router is connected to a second router connected to a second WAN, enabling the IP router to be allocated a preset number of IP addresses from the second router; and allocating the allocated IP addresses to at least one communication device connected to the IP router to form a sub network between the at least one communication device connected to the IP router and a communication device connected to the second router.

The method may further include enabling the at least one communication device connected to the IP router to communicate with the first WAN by using an IP address allocated to the first WAN.

The method may further include enabling the at least one communication device connected to the IP router to communicate with the second WAN by using an IP address allocated to the second WAN and the allocated IP addresses.

The method may further include enabling the at least one communication device connected to the IP router to communicate with a communication device connected to the second router by using the allocated IP addresses.

The method may further include enabling the at least one communication device connected to the IP router to communicate with the first or second WAN according to preset setting.

The method may further include: if the IP router is booted up, blocking an operation of a third communication interface unit; and sensing whether the second router has been connected to a second communication interface unit.

The number of IP addresses, which is greater than or equal to the number of communication devices connected to the IP router, may be allocated from the second router.

According to an aspect of another exemplary embodiment, there is provided a computer-readable recording medium including a program for executing a method of allocating an IP address of an IP router which is connectable to a first WAN. The method may include: if the IP router is connected to a second router connected to a second WAN, enabling the IP router to be allocated a preset number of IP addresses from the second router; and allocating the allocated IP addresses to at least one communication device connected to the IP router to form a sub network between the at least one communication device connected to the IP router and a communication device connected to the second router.

According to an aspect of another exemplary embodiment, there is provided a method of forming a sub network between communication devices connected to different routers, the method including: providing a first sub network between at least one first communication device connected to an IP router; providing a second sub network between at least one second communication device connected to a second router; forming, by the IP router, a third sub network between the at least one first communication device and the at least one second communication device, wherein the at least one first communication device is not directly connected to the second router, and the at least one second communication device is not directly connected to the IP router.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

Figure 1:
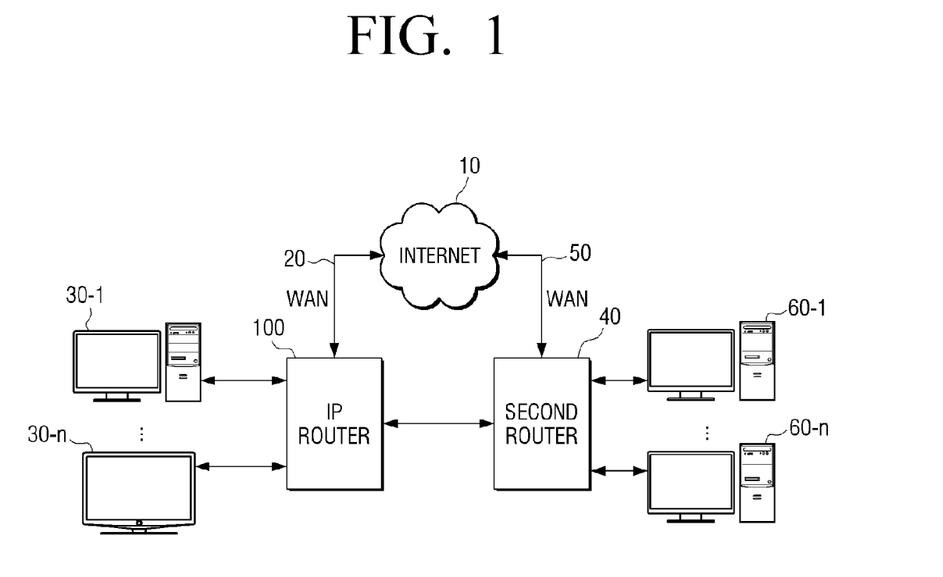
FIG. 1 is a view illustrating a structure of a communication system according to an exemplary embodiment.

FIG. 1 is a view illustrating a structure of a communication system 1000 according to an exemplary embodiment.

Referring to FIG. 1, the communication system 1000 includes an Internet Protocol (IP) router 100, a second router 40, first communication devices 30-1, . . . , and 30-n, and second communication devices 60-1, . . . , and 60-n.

The second router 40 is connected to an Internet 10 through a second wide area network (WAN) 50, and the second communication devices 60-1, . . . , and 60-n connected to the second router 40 share an IP address allocated to the second WAN 50 to communicate with the second WAN 50.

The IP router 100 is connected to the Internet 10 through a first WAN 20, and the first communication devices 30-1, . . . , and 30-n connected to the IP router 100 share an IP address allocated to the first WAN 20 to communicate with the first WAN 20.

The IP router 100 is allocated IP addresses from the second router 40 and allocates the IP addresses to the first communication devices 30-1, . . . , and 30-n connected to the IP router 100 in order to form a sub network between the first communication devices 30-1, . . . , and 30-n connected to the IP router 100 and the second communication devices 60-1, . . . , and 60-n connected to the second router 40. A detailed structure and operation of the IP router 100 will be described below with reference to FIG. 2.

As described above, in the communication system 1000 according to the present exemplary embodiment, the first communication devices 30-1, . . . , and 30-n connected to the IP router 100 and the second communication devices 60-1, . . . , and 60-n connected to the second router 40 are located in one subnet. Therefore, the first communication devices 30-1, . . . , and 30-n connected to the IP router 100 interactively and freely communicate with the second communication devices 60-1, . . . , and 60-n connected to the second router 40.

Figure 2:
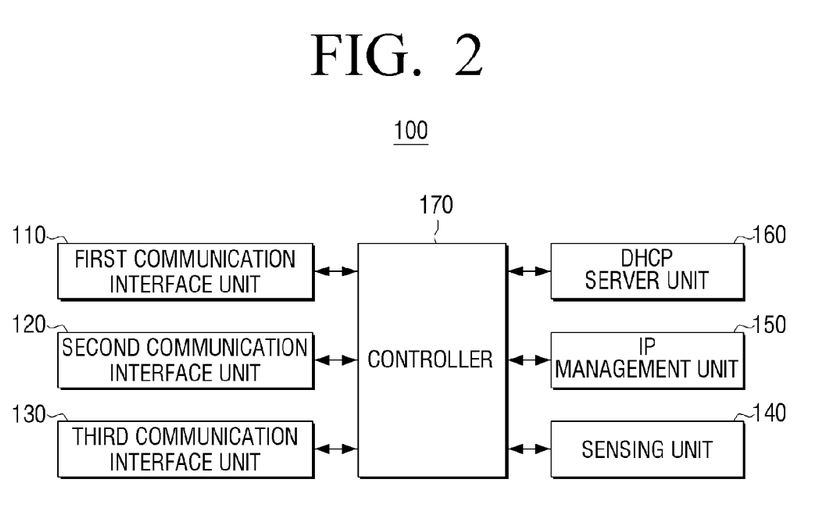
FIG. 2 is a block diagram illustrating a structure of an Internet Protocol (IP) router of FIG. 1.

FIG. 2 is a block diagram illustrating a structure of the IP router 100 of FIG. 1.

Referring to FIG. 2, the IP router 100 according to the present exemplary embodiment includes a first communication interface unit 110, a second communication interface unit 120, a third communication interface unit 130, a sensing unit 140, an IP management unit 150, a Dynamic Host Configuration Protocol (DHCP) server 160, and a controller 170.

The first communication interface unit 110 performs a communication connection to the first WAN 20. In detail, the first communication interface unit 110 connects the IP router 100 to an external Internet network and may be connected to the external Internet network through a WAN or through a wireless communication (e.g., Global System/Standard for Mobile Communication (GSM), Universal Mobile Telephone System (UMTS), Long Term Evolution (LTE), etc.)

The second communication interface unit 120 performs a communication connection to the second router 40. In detail, the second communication interface unit 120 may be connected to the second outer 40 through a local area network (LAN) or a wireless communication method (e.g., a wireless LAN).

The third communication interface unit 130 performs a communication connection to at least one of the first communication devices 30-1, . . . , and 30-n connected to the IP router 100. In detail, the third communication interface unit 130 may be connected to the communication devices 30-1, . . . , and 30-n through a LAN or a wireless communication method (e.g., a wireless LAN).

The second and third communication interface units 120 and 130 include Ethernet switches (not shown). Here, the Ethernet switches forward DHCP packets input into all ports to the DHCP manager 160. Under control of the sensing unit 140 which will be described below, if the IP router 100 is booted up, the Ethernet switches trap DHCP packets to block a DHCP between the first communication devices 30-1, . . . , and 30-n connected to the IP router 100 and the second router 40.

The second and third communication interface units 120 and 130 are separately provided in the present exemplary embodiment. However, one of a plurality of ports of the third communication interface unit 130 connected to the second router 40 may operate as the second communication interface unit 120 in one or more other exemplary embodiments.

If the IP router 100 is booted up, the sensing unit 140 blocks an operation of the third communication interface unit 130. In detail, if the IP router 100 is booted up, the sensing unit 140 may enable a DHCP packet trap operation in the Ethernet switch of the third communication interface unit 130 in order to block the DHCP between the first communication devices 30-1, . . . , and 30-n connected to the IP router 100 and the second router 40.

The sensing unit 140 senses whether the second router 40 is connected to the second communication interface unit 120. In detail, under control of the IP management unit 150 which will be described below, the sensing unit 140 may broadcast a DHCPDISCOVER packet and, if a DHCP OFFER response is received, may sense that the second router 40 is connected to the second communication interface unit 120. A communication port which has received the DHCPOFFER response may be set to a port connected to the second router 40. In other words, one of the ports of the third communication interface unit 130 which has received the DHCPOFFER response may operate as the second communication interface unit 120.

If the IP management unit 150 is connected to the second router 40 connected to the second WAN 50, the IP management unit 150 is allocated a preset number of IP addresses from the second router 40. In detail, if the IP router 100 is booted up, the IP management unit 150 may control the sensing unit 140 to enable the DHCP packet trap operation in the Ethernet switch and sense whether the second router 40 has been connected to the second communication interface unit 120.

If it is sensed that the second router 40 is connected to the second communication interface unit 120, the IP management unit 150 may request the preset number of IP addresses from the second router 40 to be allocated from the second router 40. Here, the preset number of IP addresses may be greater than or equal to the number of first communication devices 30-1, . . . , and 30-n connected to the IP router 100 and may be a default value (e.g., 20). If a communication device is additionally connected to the IP router 100, the IP management unit 150 may be additionally allocated an IP address from the second router 40.

The IP management unit 150 respectively allocates the allocated IP addresses to the first communication devices 30-1, . . . , and 30-n connected to the IP router 100. In detail, the IP management unit 150 may respectively allocate the allocated IP addresses to the first communication devices 30-1, . . . , 30-n and may set the other allocated IP address to a DHCP pool. The IP management unit 150 may set the IP addresses allocated to the first communication devices 30-1, . . . , and 30-n to a domain name server (DNS) and a default gateway.

The IP management unit 150 may control the sensing unit 140 to periodically renew the allocated IP addresses, respectively, and periodically sense a connection state of the second router 40.

The DHCP server unit 160 allocates the allocated IP addresses to at least one of the first communication devices 30-1, . . . , and 30-n connected to the IP router 100. In detail, if the DHCP server unit 160 is allocated the IP addresses from the second router 40, the DHCP server unit 160 may control the IP management unit 150 to respectively allocate the allocated IP addresses to the first communication devices 30-1, . . . , and 30-n connected to the IP router 100.

The DHCP server unit 160 controls a communication operation of the IP router 100. In detail, the DHCP server unit 160 may transmit packets, which are respectively received from the first, second, and third communication interface units 110, 120, and 130, to ports respectively corresponding to the packets. For example, if packets, which are to be transmitted to an Internet network, are received from the first communication devices 30-1, . . . , and 30-n connected to the IP router 100, the DHCP server unit 160 may control the first communication interface unit 110 to transmit the received packets through the first WAN 20. If a packet is received from the first WAN 20 in response, the DHCP server unit 160 may control the third communication interface unit 130 to transmit the received packet to a corresponding communication device.

If packets, which are to be transmitted to the Internet network, are received from the first communication devices 30-1, . . . , and 30-n connected to the IP router 100, the DHCP server unit 160 may control the second communication interface unit 120 to transmit the received packets through the second WAN 50 connected to the second router 40. If a packet is received from the second communication interface unit 120 in response, the DHCP server unit 160 may control the third communication interface unit 130 to transmit the received packet to a corresponding communication device.

If packets, which are to be transmitted to the second communication devices 60-1, . . . , and 60-n connected to the second router 40, are received from the first communication devices 30-1, . . . , and 30-n connected to the IP router 100, the DHCP server unit 160 may control the second communication interface unit 120 to transmit the received packets to the second communication devices 60-1, . . . , and 60-n connected to the second router 40. If a packet is received from the second communication interface unit 120 in response, the DHCP server unit 160 may control the third communication interface unit 130 to transmit the received packet to a corresponding communication device connected to the IP router 100.

As described above, the DHCP server unit 160 may enable the first communication devices 30-1, . . . , and 30-n connected to the IP router 100 to be connected to the Internet 10 through the first WAN 20 or through the second WAN 50 connected to the second router 40. This operation may be realized by pre-setting. For example, if the first communication device 30-1 is set to be connected to the Internet 10 through the first WAN 20, and another first communication device 30-n is set to be connected to the Internet 10 through the second WAN 50, the DHCP server unit 160 may control the first communication interface unit 110 to transmit a packet from the first communication device 30-1 to the Internet 10 through the first WAN 20 and control the second communication interface unit 120 to transmit a packet from the other communication device 30-n to the Internet 10 through the second WAN 50. This setting may be set by a manager or a user of the IP router 100. For example, the setting may be automatically set according to a usable bandwidth of the first WAN 20.

The controller 170 controls elements of the IP router 100. In detail, if the IP router 100 is booted up, the controller 170 may control the IP management unit 150 to be allocated the IP addresses from the second router 40 and control the DHCP server unit 160 to allocate the allocated IP addresses to the first communication devices 30-1, . . . , and 30-n connected to the IP router 100.

As described above, the IP router 100 according to the present exemplary embodiment is allocated IP addresses from the second router 40 connected to the IP router 100 and allocates the allocated IP addresses to the first communication devices 30-1, . . . , and 30-n connected to the IP router 100. Therefore, the first communication devices 30-1, . . . , and 30-n connected to the IP router 100 interactively and freely communicate with the second communication devices 60-1, . . . , and 60-n connected to the second router 40.

Figure 3:
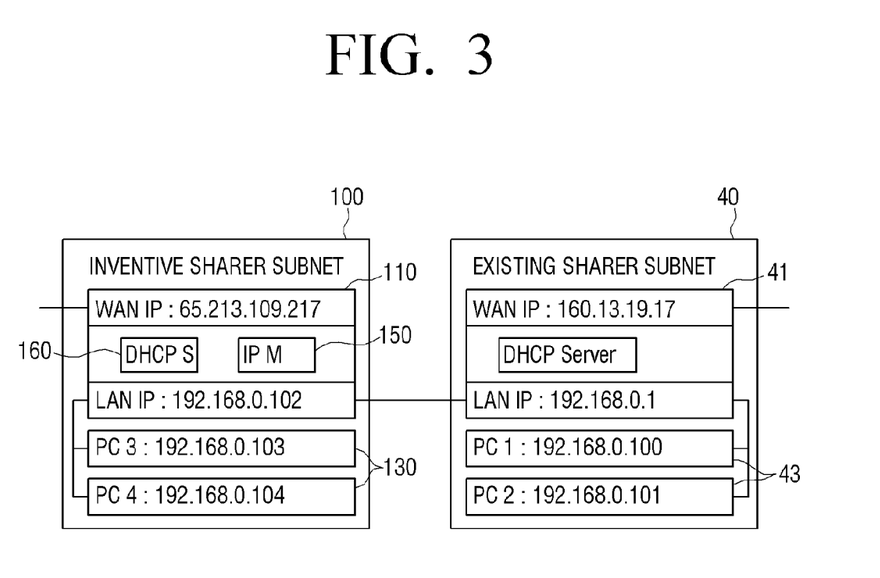
FIG. 3 is a view illustrating an operation of a communication system according to an exemplary embodiment.

FIG. 3 is a view illustrating an operation of a communication system according to an exemplary embodiment.

The second router 40 is connected to the second WAN 50 and has an IP address 41 (e.g., 160.13.19.17:41) for the second WAN 50. The second router 40 also allocates IP addresses 43 to the second communication devices 60-1, ..., and 60-*n* connected thereto and allocates a plurality of IP addresses 130 to the IP router 100 according to a request of the IP router 100.

The IP router 100 is connected to the first WAN 20 and has an IP address 110 (e.g., 65.213.109.217) for the first WAN 20. The IP router 100 requests the preset number of IP addresses to be allocated from the second router 40 and allocates the allocated IP addresses to the first communication devices 30-1, ..., and 30-*n* connected to the IP router 100.

As described above, the IP router 100 allocates the IP addresses 130 allocated from the second router 40 to the first communication devices 30-1, ..., and 30-*n* connected to the IP router 100. Therefore, the first communication devices 30-1, ..., and 30-*n* connected to the IP router 100 and the second communication devices 60-1, ..., and 60-*n* connected to the second router 40 have one subnet address. As a result, the first communication devices 30-1, ..., and 30-*n* connected to the IP router 100 interactively and freely communicate with the second communication devices 60-1, ..., and 60-*n* connected to the second router 40.

Figure 4:
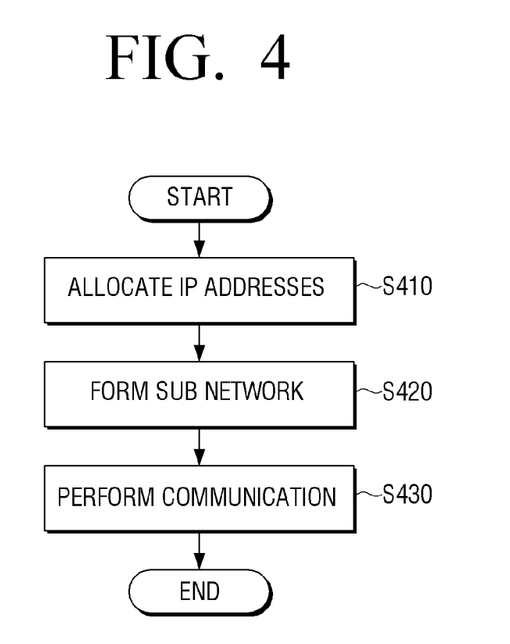
FIG. 4 is a flowchart illustrating a method of allocating an IP address according to an exemplary embodiment.

FIG. 4 is a flowchart illustrating a method of allocating an IP address according to an exemplary embodiment.

Referring to FIG. 4, if the IP router 100 is connected to the second router 40 connected to the second WAN 50, the IP router 100 is allocated the preset number of IP addresses from the second router 40 in operation S410. In detail, if the IP router 100 is booted up, the IP router 100 may enable DHCP packet trap operations in the Ethernet switches and sense whether the second router 40 is connected. If it is sensed that the second router 40 is connected, the IP router 100 may request the preset number of IP addresses to be allocated from the second router 40. Here, the preset number of IP addresses may be greater than or equal to the number of first communication devices 30-1, ..., and 30-*n* connected to the IP router 100 and may be a default value (e.g., 20).

In operation S420, the IP router 100 allocates the allocated IP addresses to at least one of the first communication devices 30-1, ..., and 30-*n* connected to the IP router 100 in order to form a sub network between the first communication devices 30-1, ..., and 30-*n* connected to the IP router 100 and the second communication devices 60-1, ..., and 60-*n* connected to the second router 40. In detail, the IP router 100 may allocate the allocated IP addresses to the first communication devices 30-1, ..., and 30-*n*, respectively, and set the other allocated IP address to a DHCP pool. Also, the IP router 100 may set the IP addresses allocated to the first communication devices 30-1, ..., and 30-*n* to a DNS and a default gateway.

In operation S430, the IP router 100 performs a communication operation by using the allocated IP addresses. In detail, if packets, which are to be transmitted to the Internet 10, are received from the first communication devices 30-1, ..., and 30-*n* connected to the IP router 100, the IP router 100 may transmit the received packets through the first WAN 20. If a packet is received from the first WAN 20 in response, the IP router 100 may transmit the received packet to a corresponding communication device.

If the packets, which are to be transmitted to the Internet 10, are received from the first communication devices 30-1, ..., and 30-*n* connected to the IP router 100, the IP router 100 may transmit the received packets through the second WAN 50 connected to the second router 40. If a packet is received from the second router 40 in response, the IP router 100 may transmit the received packet to a corresponding communication device.

If packets, which are to be transmitted to the second communication devices 60-1, ..., and 60-*n* connected to the second router 40, are received from the first communication devices 30-1, ..., and 30-*n* connected to the IP router 100, the IP router 100 may transmit the received packets to the second router 40 in order to transmit the corresponding packets to the second communication devices 60-1, ..., and 60-*n* connected to the second router 40. If a packet is received from the second router 40 in response, the IP router 100 may transmit the received packet to a communication device connected to the IP router 100.

Figure 5:
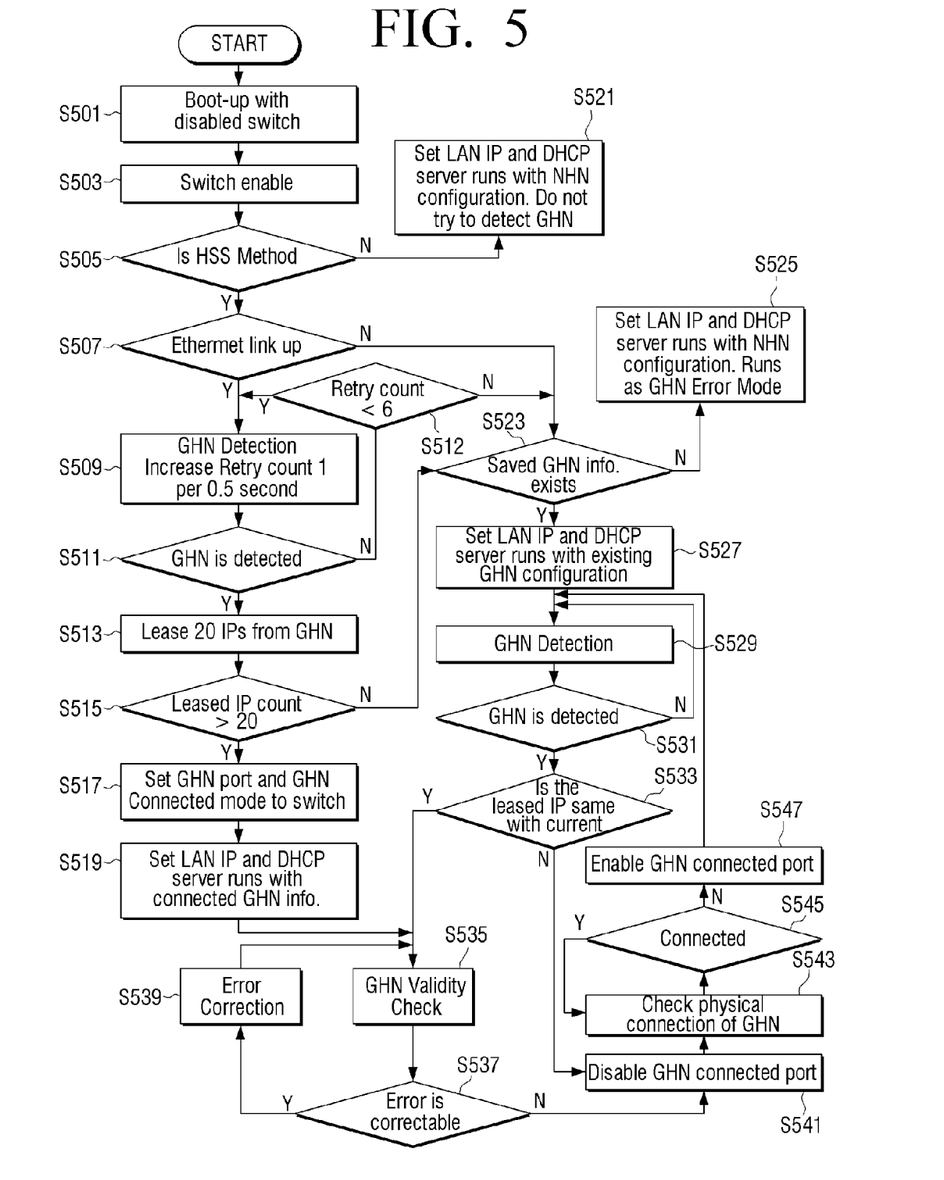
FIG. 5 is a flowchart illustrating the method of FIG. 4 in detail.

FIG. 5 is a flowchart illustrating the method of FIG. 4 in detail.

Referring to FIG. 5, if the IP router 100 is booted up, a DHCP packet trap operation is enabled to block a DHCP between the first communication devices 30-1, ..., and 30-*n* connected to the IP router 100 and the second router 40 in operation S501.

In operation S503, an Ethernet switch is enabled. In operation S505, a determination is made as to whether communication devices connected to two routers are to have Home Single Subnetting (HSS), i.e., the same subnet. If it is determined in operation S505 that the HSS has not been performed, the IP router 100 independently generates an IP address and allocates the IP address to a communication device connected thereto in operation S521.

If it is determined in operation S505 that the HSS has been performed, a determination is made as to whether an Ethernet has been linked up in operation S507.

If it is determined in operation S507 that the Ethernet has been linked up, whether the second router 40 has been connected to the IP router 100 is sensed in operation S509. If the IP router 10 is not detected in operation S511, a sensing operation of the second router 40 is performed a preset number of times in operation S512. In the present exemplary embodiment, whether the second router 40 has been connected is sensed five or more times. However, it is understood that another exemplary embodiment is not limited thereto. For example, according to one or more other exemplary embodiments, the number of times may be changed, and only one time may be sensed.

If the second router 40 is detected in operation S511, a preset number of IP addresses are allocated from the second router 40 in operation S513.

If the number of IP addresses allocated from the second router 40 is greater than or equal to the preset number in operation S515, a port connected to the second router 40 may be switched to a router connection mode in operation S517. An operation of determining whether the number of allocated IP addresses is equal to the preset number may be omitted.

If the number of IP addresses allocated from the second router 40 is smaller than or equal to the preset number in operation S515 or the Ethernet has not been linked up in operation S507, a determination is made as to whether information about the second router 40 has been stored in operation S523.

If it is determined in operation S523 that the information about the second router 40 has been stored, an IP allocation is performed with respect to a connected communication device by using the stored information in operation S527.

If it is determined in operation S523 that the information about the second router 40 has not been stored, an error message that building of a subnet is not possible or completed is displayed in operation S525.

In operation S517, the allocated IP addresses are allocated to the first communication devices 30-1, ..., and 30-*n* connected to the IP router 100 to form the first communication devices 30-1, ..., and 30-*n* connected to the IP router 100 and the second communication devices 60-1, . . . , and 60-n connected to the second router 40 into one subnet.

If this environment is established, whether a connection to the second router 40 has been maintained is sensed in operation S519. If an error does not occur in operation S537, an operation of periodically sensing whether the connection to the second router 40 has been maintained is performed in operations S539 and S535.

If the connection to the second router 40 is blocked in operation S537, a port connected to the second router 40 is blocked in operation S541. In operation S543, a physical connection to the second router 30 is checked. If it is checked in operation S543 that the second router 40 is physically connected (Y at operation S545), the port connected to the second router 40 is enabled in operation S547. In operation S529, the second router 40 is detected. In operation S533, whether allocated IP addresses are valid is checked if the second router is detected (Y at operation S531).

As described above, in the method of allocating the IP address according to the present exemplary embodiment, IP addresses allocated from the second router 40 are allocated to the first communication devices 30-1, . . . , and 30-n connected to the IP router 100. Also, the first communication devices 30-1, . . . , and 30-n connected to the IP router 100 and the second communication devices 60-1, . . . , and 60-n connected to the second router 40 have one subnet address. Therefore, the first communication devices 30-1, . . . , and 30-n connected to the IP router 100 interactively and freely communicate with the second communication devices 60-1, . . . , and 60-n connected to the second router 40. The IP address allocating method as shown in FIGS. 4 and 5 may be performed by an IP router having the same or similar structure of the exemplary embodiment illustrated in FIG. 2 or IP routers having other types of structures.

Also, the above-described IP address allocating method may be realized as at least one execution program for executing the IP address allocating method, and the execution program may be stored on a computer-readable recording medium.

Therefore, each block of the present inventive concept may be executed as a computer-recordable code on a computer-readable recording medium. The computer-readable recording medium may be a device which may store data which may be read by a computer system. Moreover, one or more of the above-described units can include a processor or microprocessor executing a computer program stored in a computer-readable medium.

The foregoing exemplary embodiments and advantages are merely exemplary and are not to be construed as limiting. The present teaching can be readily applied to other types of apparatuses and methods. Also, the description of exemplary embodiments is intended to be illustrative, and not to limit the scope of the claims, and many alternatives, modifications, and variations will be apparent to those skilled in the art.

What is claimed is:

1. An Internet Protocol (IP) router which is connectable to a first wide area network (WAN), the IP router comprising:
   an IP management unit which receives an allocation of a predetermined number of IP addresses from a second router, different from the IP router, connected to a second WAN;
   a Dynamic Host Configuration Protocol (DHCP) server unit which allocates the allocated predetermined number of IP addresses to a first communication device connected to the IP router to form a same sub network between the first communication device and a second communication device connected to the second router, the second communication device belonging to a different sub network from the first communication device;
   a first communication interface unit which performs a communication connection to the first WAN;
   a second communication interface unit which performs a communication connection to the second router;
   a third communication interface unit which performs a communication connection to the first communication device connected to the IP router; and
   a sensing unit which blocks an operation of the third communication interface unit and senses whether the second router is connected to the second communication interface unit.

2. The IP router of claim 1, wherein the DHCP server unit controls the first communication device connected to the IP router to communicate with the first WAN through the first communication interface unit.

3. The IP router of claim 1, wherein the DHCP server unit controls the first communication device connected to the IP router to communicate with the second WAN through the second communication interface unit.

4. The IP router of claim 1, wherein the DHCP server unit controls the first communication device connected to the IP router to communicate with the second communication device connected to the second router through the second communication interface unit.

5. The IP router of claim 1, wherein the DHCP server unit controls the first communication device connected to the IP router to selectively communicate with one of the first WAN and the second WAN according to a predetermined setting.

6. The IP router of claim 1, wherein the sensing unit enables a DHCP packet trap operation of the third communication interface unit to block a DHCP communication between the first communication device and the second router.

7. The IP router of claim 1, wherein the predetermined number of IP addresses is greater than or equal to the number of the first communication device connected to the IP router.

8. A method of allocating an IP address of an IP router which is connectable to a first WAN, the method comprising:
   if the IP router is connected to a second router connected to a second WAN, the IP router being different from the second router, enabling the IP router to be allocated a predetermined number of IP addresses from the second router;
   allocating, by the IP router, the allocated predetermined number of IP addresses to a first communication device connected to the IP router to form a same sub network between the first communication device connected to the IP router and a second communication device connected to the second router, the second communication device belonging to a different sub network from the first communication device,
   blocking an operation of a third communication interface unit, of the IP router, which performs a communication connection to the first communication device connected to the IP router; and
   sensing whether the second router is connected to a second communication interface unit, of the IP router, which performs a communication connection to the second router.

9. The method of claim 8, further comprising:
   enabling the first communication device connected to the IP router to communicate with the first WAN by using an IP address allocated to the first WAN.

10. The method of claim 8, further comprising:
enabling the first communication device connected to the IP router to communicate with the second WAN by using an IP address allocated to the second WAN and the allocated IP addresses.

11. The method of claim 8, further comprising:
enabling the first communication device connected to the IP router to communicate with the second communication device connected to the second router by using the allocated IP addresses.

12. The method of claim 8, further comprising:
enabling the first communication device connected to the IP router to selectively communicate with one of the first WAN and the second WAN according to a predetermined setting.

13. The method of claim 8, wherein the predetermined number of IP addresses is greater than or equal to the number of the first communication device connected to the IP router.

14. A non-transitory computer-readable recording medium having recorded thereon a program executable by a computer for performing the method of claim 8.

* * * * *